W. S. BUTLER.
FLOUR SIFTER.
APPLICATION FILED JAN. 31, 1910.
976,782.
Patented Nov. 22, 1910.
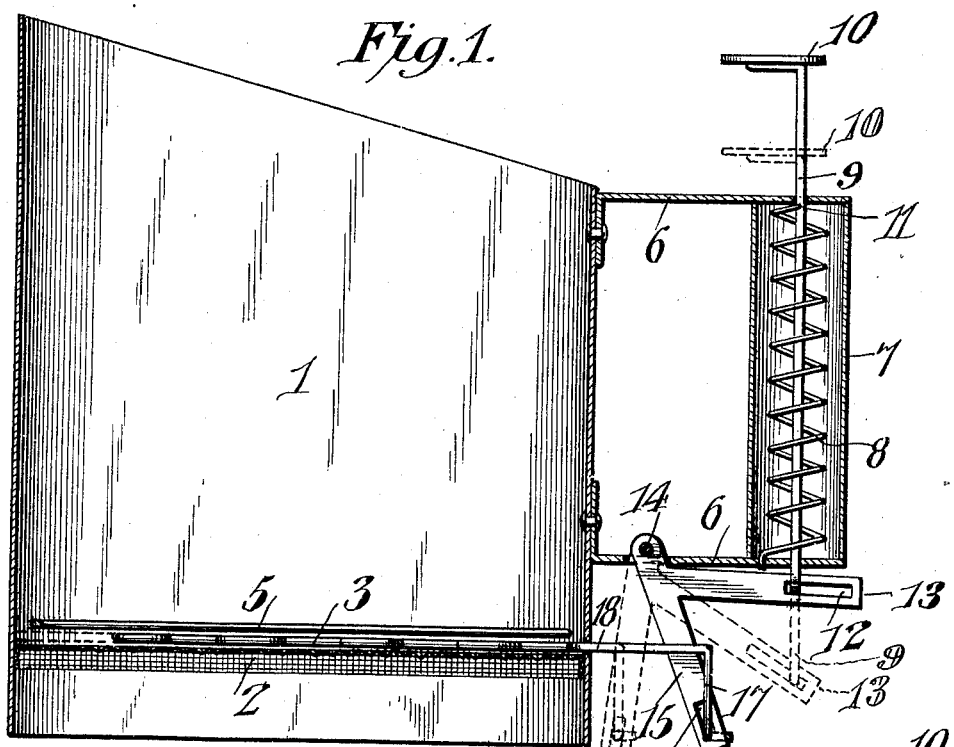
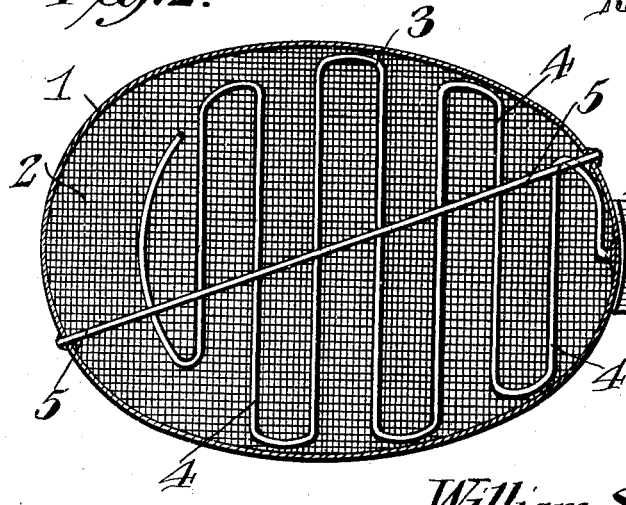
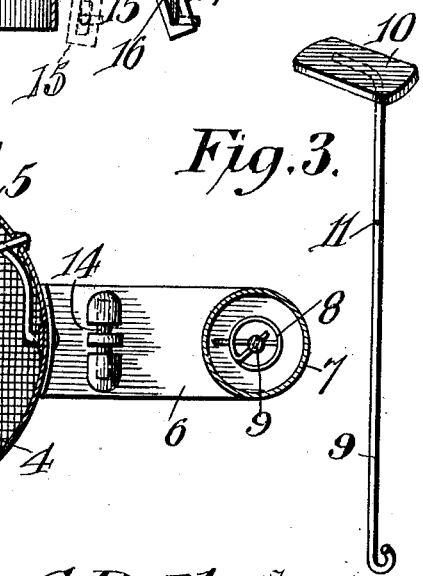
Witnesses
William S. Butler, Inventor
By
Attorney

UNITED STATES PATENT OFFICE.

WILLIAM SANDERS BUTLER, OF DULUTH, MINNESOTA.

FLOUR-SIFTER.

976,782.　　　　Specification of Letters Patent.　　Patented Nov. 22, 1910.

Application filed January 31, 1910.　Serial No. 541,197.

*To all whom it may concern:*

Be it known that I, WILLIAM S. BUTLER, a citizen of the United States, residing at Duluth, in the county of St. Louis and State of Minnesota, have invented a new and useful Flour-Sifter, of which the following is a specification.

This invention relates to improvements in flour sifters and has for its object the production of a simple and inexpensive sifter, which is adapted for domestic use, and which may be operated conveniently by a single hand and with either hand.

The invention consists in providing a casing within which is a reciprocating stirrer, and on the side of the casing is a handle disposed parallel with the casing and having a reciprocating member therein connected with the stirrer.

The invention also consists in certain novel features of construction and arrangement, which will be hereinafter first fully described and then more particularly pointed out in the appended claims.

In the annexed drawings, which illustrate the preferred embodiment of the invention, Figure 1 is a vertical section of a sifter, indicating the movements of the parts by means of full lines and dotted lines. Fig. 2 is a horizontal section of the sifter. Fig. 3 is a detail perspective view of the actuating device.

The casing 1 is of sheet metal and may be of any convenient shape or size, but is preferably of the substantially elliptical form shown in Fig. 2, as such shape is best adapted for the effective sifting of the flour and provides ample capacity without causing the sifter to be unduly bulky.

The upper end of the casing is open and is preferably slightly inclined in order to facilitate the manipulation of the device as a scoop, while the lower end of the casing is provided with a screen 2 extending across the same, as clearly shown in Figs. 1 and 2. Above this netting or screen 2 is a stirrer 3 which is constructed of a wire having its intermediate portion bent to form the parallel arms 4 extending between the sides of the casing and resting close against the screen, the stirrer, thus formed, being of a slightly less area than the screen, so that the movement of the stirrer from one side of the casing to the other side thereof, will be permitted. The stirrer is held to the screen so as to act upon the flour without rising from the screen, by a keeper 5, which consists of a single wire having its ends secured to the walls of the casing and extending across the path of movement of the stirrer. On the outer side of the casing, I secure the brackets or lugs 6, between which, at the outer ends thereof, extends a handle or tube 7 within which is a coil spring 8, attached to an actuating device or pitman 9 which extends longitudinally through the handle 7 and is provided at its upper end with a thumb plate 10, as shown. The spring 8 has its lower end secured to the lower bracket or lug 6 and its upper end secured in an opening 11 in the pitman 9, whereby, when the said pitman is depressed, the spring will raise the pitman upon the release of the pressure on the thumb plate 10. The lower end of the pitman 9 is engaged in a longitudinal slot 12 in one arm 13 of an angle lever, which is fulcrumed upon a pin 14 secured on the upper side of the lower bracket 6, and the other depending arm 15 of this handle lever is provided with a longitudinal slot 16 which is engaged by the downturned end 17 of the stirrer, the said downturned end 17 being formed at the extremity of a projecting portion 18 of the stirrer which extends through an opening in the side of the casing and thereby serves as a guide for the stirrer in its movements.

The operation and advantages of the device will be readily understood from the foregoing description, taken in connection with the accompanying drawings. The device is grasped by means of the handle member 7 and a quantity of flour is scooped up, as will be readily understood. The sifter being then held over a suitable bowl or other receptacle, the thumb of the operator is placed upon the thumb-plate 10, and the said thumb-plate pressed toward the upper lug 6, whereupon the pitman 9 will be pushed longitudinally through the handle member 7 and the angle lever 13—15 vibrated, as indicated by dotted lines in Fig. 1, and the stirrer consequently moved over the screen 2. When the thumb-plate is depressed to actuate the pitman 9, the spring 8 will be compressed and will tend to resist the downward movement of the pitman, so that when the thumb is released from the thumb-plate, the spring will at once expand and raise the pitman, thereupon returning the several parts to their initial positions indicated in full line in Fig. 1. By thus rapidly depressing the thumb plate and the attached pitman, and permitting the same to rise, the stirrer will be reciprocated rapidly over the screen and will agitate the flour so that the cleaned flour will pass through the screen into the receptacle in the manner usual with devices of this class.

It will be observed that my device is exceedingly simple in its construction, and is composed of very few parts. The handle is so disposed that the device will be held in the same manner as an ordinary scoop or cup, and may be operated by the thumb of the same hand by which the device is held. The operation of sifting flour for domestic purposes is consequently rendered less fatiguing than with the devices heretofore known. The device will operate very easily and rapidly, and the slotted construction of the arms of the angle lever permits the parts connected thereto to ride easily upon the said angle lever so as to be actuated thereby without binding thereon or without exerting any bending strain on any of the parts.

Having thus described the invention, what I claim as new, and desire to secure by Letters Patent, is:—

1. In a sifter, the combination of a casing having a screened bottom, a stirrer arranged to reciprocate across the casing in contact with the bottom, a vertically-disposed tubular handle having lugs at the top and bottom which are secured to the casing at an angle thereto, a vertically-disposed pitman passing through the handle and arranged to reciprocate longitudinally of the same and extended above the top of the handle in convenient reach of the thumb so as to be actuated thereby, a spring housed within the handle and directly acting on said pitman, and connections between the lower end of the pitman and the stirrer, said connections being arranged outside the handle.

2. In a sifter, the combination of a casing having a screened bottom, a stirrer mounted within the casing over the bottom, a tubular handle secured to the casing at one side thereof, a pitman passing through the handle and projecting from each end thereof, the upper end being provided with a thumb plate, a coiled spring arranged within the handle and connected with the pitman, and a lever pivoted to the lower end of the handle and connected, respectively, with the pitman and the stirrer.

3. In a sifter, the combination of a casing having a screened bottom, a stirrer mounted to reciprocate on the said bottom and having one end projecting through the casing, a handle secured to and disposed substantially parallel with the casing, a pitman mounted longitudinally within the handle and provided with a thumb-plate at its upper end, a spring coiled around the pitman within the handle and having its opposite ends secured respectively to the handle and the pitman, and an angle lever having its ends connected with the lower end of the pitman and with the projecting end of the stirrer respectively.

In testimony, that I claim the foregoing as my own, I have hereto affixed my signature in the presence of two witnesses.

WILLIAM SANDERS BUTLER.

Witnesses:
L. H. WHIPPLE,
C. W. PETERSON.